US012213239B1

United States Patent

Kim et al.

(10) Patent No.: US 12,213,239 B1
(45) Date of Patent: Jan. 28, 2025

(54) PULSED ION CURRENT TRANSMITTER WITH CYCLICAL CURRENT AGGREGATION

(71) Applicant: Enig Associates, Inc., Rockville, MD (US)

(72) Inventors: Yil-Bong Kim, Silver Spring, MD (US); Eric N. Enig, Bethesda, MD (US)

(73) Assignee: ENIG ASSOCIATES, INC., Rockville, MD (US)

( * ) Notice: Subject to any disclaimer, the term of this patent is extended or adjusted under 35 U.S.C. 154(b) by 0 days.

(21) Appl. No.: 18/532,078

(22) Filed: Dec. 7, 2023

(51) Int. Cl.
*H05H 7/08* (2006.01)
*H05H 7/04* (2006.01)

(52) U.S. Cl.
CPC ................ *H05H 7/08* (2013.01); *H05H 7/04* (2013.01); *H05H 2007/045* (2013.01); *H05H 2242/10* (2013.01)

(58) Field of Classification Search
None
See application file for complete search history.

(56) References Cited

U.S. PATENT DOCUMENTS 3,120,363 A * 2/1964 Hagen ................... B64C 23/005 244/62
5,963,169 A * 10/1999 Anderson ................ H01Q 1/26 343/785
6,046,705 A * 4/2000 Anderson .............. H01Q 19/10 343/834
6,087,993 A * 7/2000 Anderson ................ H01Q 1/26 343/709
6,211,617 B1 * 4/2001 Deegan .................... H05H 1/46 315/39
6,512,483 B1 * 1/2003 Holden ............. H01Q 15/0013 343/910
6,657,594 B2 * 12/2003 Anderson .............. H01Q 1/366 343/701
8,749,179 B2 * 6/2014 Liu ........................ H05H 13/04 250/493.1

(Continued)

FOREIGN PATENT DOCUMENTS

CN 104871380 A * 8/2015 .............. F02F 1/242
JP H02-230699 A 9/1990

(Continued)

*Primary Examiner* — Srinivas Sathiraju
(74) *Attorney, Agent, or Firm* — FISHERBRYOLES, LLP; Roger L. Browdy; James E. Mrose

(57) ABSTRACT

A pulsed ion current antenna includes an enclosed racetrack having an interior configured to be placed under vacuum. The enclosed racetrack has an ion injection zone, a beam merging zone, a first beam bending zone, a beam return zone, and a second beam bending zone. An ion source is provided at an end of the ion injection zone. Two parallel magnet plates are provided in each of the first and second beam bending zones, configured to produce a respective magnetic field that bends a path of travel of an ion beam within the enclosed racetrack. A plurality of loop coils are configured to generate magnetic fields to shape travel of ions within the enclosed racetrack such that ions from the ion source that are injected through the ion injection zone are merged in the beam merging zone into an ion beam within the enclosed racetrack.

20 Claims, 7 Drawing Sheets

(56) References Cited

U.S. PATENT DOCUMENTS

| | | | | |
|---|---|---|---|---|
| 8,941,336 | B1 * | 1/2015 | Liu | H05G 2/001 250/493.1 |
| 10,201,066 | B2 * | 2/2019 | Ekinci | H05H 7/10 |
| 10,498,018 | B2 * | 12/2019 | Towle | H01Q 1/366 |
| 10,601,125 | B2 * | 3/2020 | Cohen | H01Q 1/366 |
| 10,946,219 | B2 * | 3/2021 | Tahar | A61N 5/1077 |
| 11,791,851 | B2 * | 10/2023 | Kim | H01H 3/26 375/295 |
| 11,848,693 | B2 * | 12/2023 | Kim | H01H 3/26 |
| 2003/0116427 | A1 * | 6/2003 | Ding | C23C 14/3457 204/192.15 |
| 2003/0146879 | A1 | 8/2003 | Anderson | |
| 2005/0006222 | A1 * | 1/2005 | Ding | C23C 14/35 204/192.12 |
| 2009/0130336 | A1 * | 5/2009 | Dekempeneer | C23C 14/354 204/192.1 |
| 2014/0048707 | A1 * | 2/2014 | Liu | H01J 37/02 315/503 |
| 2014/0305802 | A1 * | 10/2014 | Ding | C23C 14/046 204/298.16 |
| 2015/0248047 | A1 * | 9/2015 | Chakraborty | G02F 1/353 359/278 |
| 2018/0249568 | A1 * | 8/2018 | Ekinci | H05H 13/04 |
| 2019/0070438 | A1 * | 3/2019 | Tahar | H05H 13/085 |
| 2019/0107371 | A1 * | 4/2019 | Grace | F42C 19/0846 |
| 2021/0091952 | A1 * | 3/2021 | Wentz | H04L 9/3278 |
| 2022/0185507 | A1 * | 6/2022 | Bernhardt | B64G 1/405 |
| 2023/0198557 | A1 * | 6/2023 | Kim | H04B 1/04 375/295 |

FOREIGN PATENT DOCUMENTS

| | | | |
|---|---|---|---|
| RU | 2206958 | C2 * | 6/2003 |
| WO | 2022/256486 | A1 | 12/2022 |

* cited by examiner

PULSED ION CURRENT TRANSMITTER WITH CYCLICAL CURRENT AGGREGATION

TECHNICAL FIELD

The present invention pertains to compact low-frequency transmitters in the VLF (3-30 kHz) and LF (30 kHz-300 kHz) radio communication frequency spectrum, and more specifically pertains to compact low-frequency transmitters with a transmitter size substantially smaller than the wavelength of the carrier wave, and in particular to a novel transmitter configuration in which a pulsed ion beam current is aggregated cyclically. VLF transmitters will be used as an example herein, but the fundamental concept and technology introduced here can be applied to higher LF bands.

BACKGROUND

Concerning FIG. 1, in a different field of endeavor, there is illustrated a typical prior-art racetrack microtron 10. The microtron is a particle accelerator in which an accelerating field is applied to charged particles through a linear accelerator structure that includes two magnets each of which supplies a homogeneous magnetic field in a half-circle formed region 12. Electrons emitted from a source 14 travel through linear pathways 18 between magnetic field regions 12, in which magnetic fields bend the path of travel of the electrons 180 degrees, so that the electrons return to a linear accelerator (linac) 16. Linear accelerator 16, which is in the form of a microwave cavity, accelerates the electron, once per full turn, to a higher energy level, thereby successively increasing the path radii of the electrons through each of the magnetic field regions 12. The final linear pathway deflects electrons out of microtron 10, so that the electrons are extracted from the racetrack microtron.

Patent Cooperation Treaty Published Application WO 2022/256486, filed Jun. 2, 2022, which was filed by the same applicant and names the same inventors as the present application, and which is hereby incorporated herein by reference in its entirety, describes a VLF ion beam plasma transmitter having a toroidal vacuum tube. One or more helical coils surround the tube to generate a DC toroidal magnetic field, and a center-line current coil generates a poloidal magnetic field, resulting in a helical magnetic field confining a spinning ion beam bunch, the ions being injected by VLF, LF or MF, or HF ion guns synchronously with a spinning beam bunch in the torus. This transmitter is an electric dipole transmitter, although the radiation pattern and polarization, however, are spherical in shape and circularly polarized. The toroidal vacuum tube is filled with background plasma to neutralize the space charge of beam bunch. The spinning beam bunch speed can be determined by the gun beam voltage and the injection angle. The frequency of the output is determined by the frequency of the spinning bunch. When the beam bunch arc length is about the half circle, the output electric dipole field is the highest. Although this toroidal beam bunch transmitter looks like a magnetic loop dipole, this transmitter is indeed an electric dipole transmitter whose field strength goes like $1/r^2$ in near field and radiates like a linear electric dipole in far field. The radiation pattern and polarization, however, looks like a magnetic loop dipole. The major advantage of the toroidal beam transmitter is that the beam current inside the toroidal vacuum tube can be scaled up well above the beam gun current because the beam current can accumulate when the beam is injected from the gun synchronously with a spinning beam bunch. The frequency modulation of the toroidal beam bunch can be achieved with both a beam modulator that applies an electric field inside the torus to accelerate or decelerate beam speed and beam voltage change in the pulsed beam gun. The maximum current in a torus transmitter is determined by beam Coulomb collisions with background plasma and neutral particles. Beam plasma instability will play a role to slow down beam speed by kinetic phase space beam instability. Both of these will spread out the beam arc to fill the whole torus to make the toroidal dipole transmitter just a DC magnetic loop transmitter. Based on detailed calculations, up to a 100 A current is feasible in the VLF band and 1 kA in HF band. As the output radiation power scales with the square of the transmitter current, there is an improvement in output radiation power from either a monopolar or bipolar transmitter.

PCT published application WO 2022/256486 also describes three different modulation schemes: (1) minimum shift keying (MSK), (2) frequency modulation (FM), and (3) binary phase shift keying (BPSK). The effective bandwidth calculation for the beam transmitter according to these three different modulation schemes demonstrates a fractional effective bandwidth of 1 or nearly 1.

BRIEF SUMMARY OF THE INVENTION

The invention provides a pulsed ion current antenna that, when modulated by a combination of modulation techniques described herein, makes it possible to achieve a very high bandwidth, about 5 kilohertz for example, which in turn makes it possible to send up to 100 times more data than certain current technologies such as very large metal antennae.

One aspect of the invention features a pulsed ion current antenna that includes an enclosed racetrack having an interior configured to be placed under vacuum. The enclosed racetrack has an ion injection zone, a beam merging zone, a first beam bending zone, a beam return zone, and a second beam bending zone. An ion source is provided at an end of the ion injection zone. Two parallel magnet plates are provided in each of the first and second beam bending zones, configured to produce a respective magnetic field that bends a path of travel of an ion beam within the enclosed racetrack. A plurality of loop coils are configured to generate magnetic fields in one or more of the ion injection zone, the beam merging zone, and the beam return zone, to shape travel of ions within the enclosed racetrack such that ions from the ion source that are injected through the ion injection zone are merged in the beam merging zone into an ion beam within the enclosed racetrack, which ion beam is redirected by the first beam bending zones into the beam return zone and then redirected by the second beam bending zone back to the beam merging zone.

In certain embodiments there are a plurality of the loop coils in each of the ion injection zones, the beam merging zone, and the beam return zone. The plurality of loop coils in the ion injection zone are tapered in spacing, the spaces between the coils becoming successively narrower away from the ion source. The plurality of loop coils in the beam merging zone are configured to shape beam merging geometry so that current from the ion injection zone joins smoothly with the ion beam pulse in the beam merging zone. The plurality of loop coils in the beam return zone are tapered in spacing, the spaces between the coils becoming successively narrower. The two parallel magnet plates provided in each of the first and second beam bending zones include an electromagnet, and are configured to produce a respective magnetic field that bends a path of travel of the ion beam within the enclosed racetrack 180 degrees. At least one cooling water jacket is configured to cool the two parallel magnet plates provided in each of the first and second beam bending zones.

Another aspect of the invention features a method of operating a pulsed ion current antenna in which ions are produced from an ion source, and are caused to be injected into an enclosed racetrack under vacuum through an ion injection zone of the enclosed racetrack. The ions injected through the ion injection zone are caused to be merged in a beam merging zone of the enclosed racetrack with an ion beam pulse within the enclosed racetrack. The ions injected through the ion injection zone enter the beam merging zone when the ion beam pulse is present in the merging zone. The ion beam pulse within the enclosed racetrack is redirected by a first beam bending zone of the enclosed racetrack, into a beam return zone of the enclosed racetrack. The ion beam pulse within the enclosed racetrack is redirected again, by a second beam bending zone of the enclosed racetrack, back to the beam merging zone. The ion beam pulse within the enclosed racetrack is modulated to cause the ion beam pulse to produce a radiating electromagnetic wave with signal-carrying data.

In certain embodiments, modulation of the ion beam pulse includes modulating production of the ions from the ion source, thereby increasing speed of the ions within the ion injection zone, so that after a certain amount of time of the ions from the ion injection zone mixing with the ion beam pulse in the merging zone, the speed of ion beam pulse gradually matches with the speed of the ions within the ion injection zone.

In other embodiments, the modulating of the ion beam pulse includes modifying voltage applied to a plurality of loop coils within the enclosed racetrack to create an electrostatic field bias between the plurality of loop coils to accelerate or decelerate the ion beam pulse to change frequency of all of the ions in the ion beam pulse very quickly. The plurality of loop coils for which voltage is modified for modulating the ion beam pulse can be located within the beam merging zone. The plurality of loop coils for which voltage is modified for modulating the ion beam pulse can also used for assisting in merging the ions from the ion injection zone into the ion beam pulse.

In other embodiments, the modulating of the ion beam pulse by modifying voltage applied to the plurality of loop coils within the enclosed racetrack is combined with the modulating of the ion beam pulse by modulating the producing of the ions from the ion source.

The ion beam pulse can occupy approximately half of a pathway of the ion beam pulse through the enclosed racetrack. Injection of current through the ion injection zone can be precisely initiated and terminated, cyclically, at a frequency at which the ion beam pulse cycles through the enclosed racetrack, such that on each cycle, an initial merging of the ions from the ion injection zone into the merging zone occurs at a leading edge of the ion beam pulse.

In certain embodiments, a beam focusing technique is used in the beam merging zone to layer current from the ion injection zone onto the ion beam pulse by layering a thin layer of the current from the ion injection zone onto the ion beam pulse, and by using magnetic loop coils of the merging zone to shape beam merging geometry so that the current from ion injection zone joins smoothly with the ion beam pulse.

Ion current from the ion injection zone and the ion beam pulse in the merging zone can have approximately the same velocity, so as to ensure coherency of the ion beam pulse. Magnetic loop coils of the ion injection zone can be used to cause ion current from the ion injection zone to be injected into the beam merging zone parallel to the ion beam pulse.

The details of various embodiments of the invention are outlined in the accompanying drawings and the description below. Numerous other features and advantages of the invention will be apparent from the description, the drawings, and the claims.

DETAILED DESCRIPTION

Figure 1:
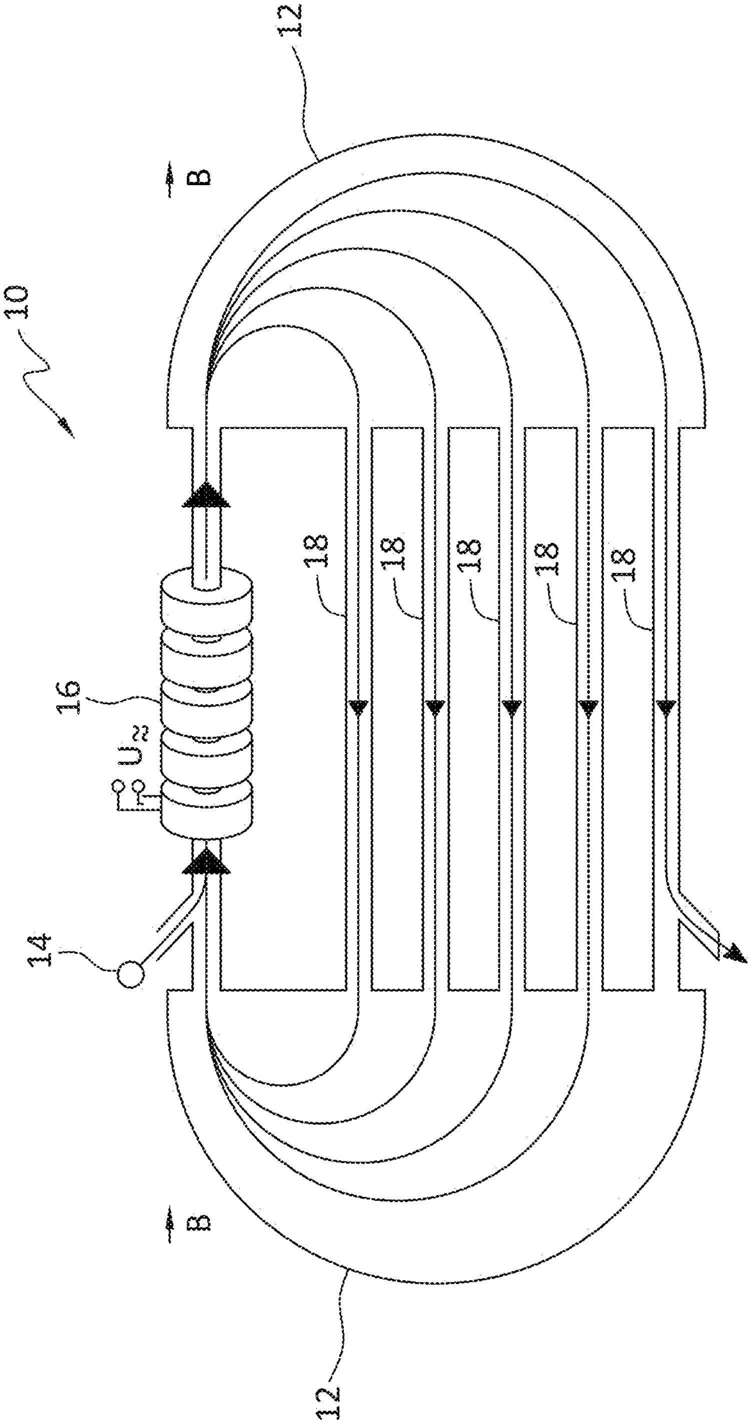
FIG. 1 PRIOR ART
FIG. 1 is a schematic drawing of a prior-art racetrack microtron.
Figure 2:
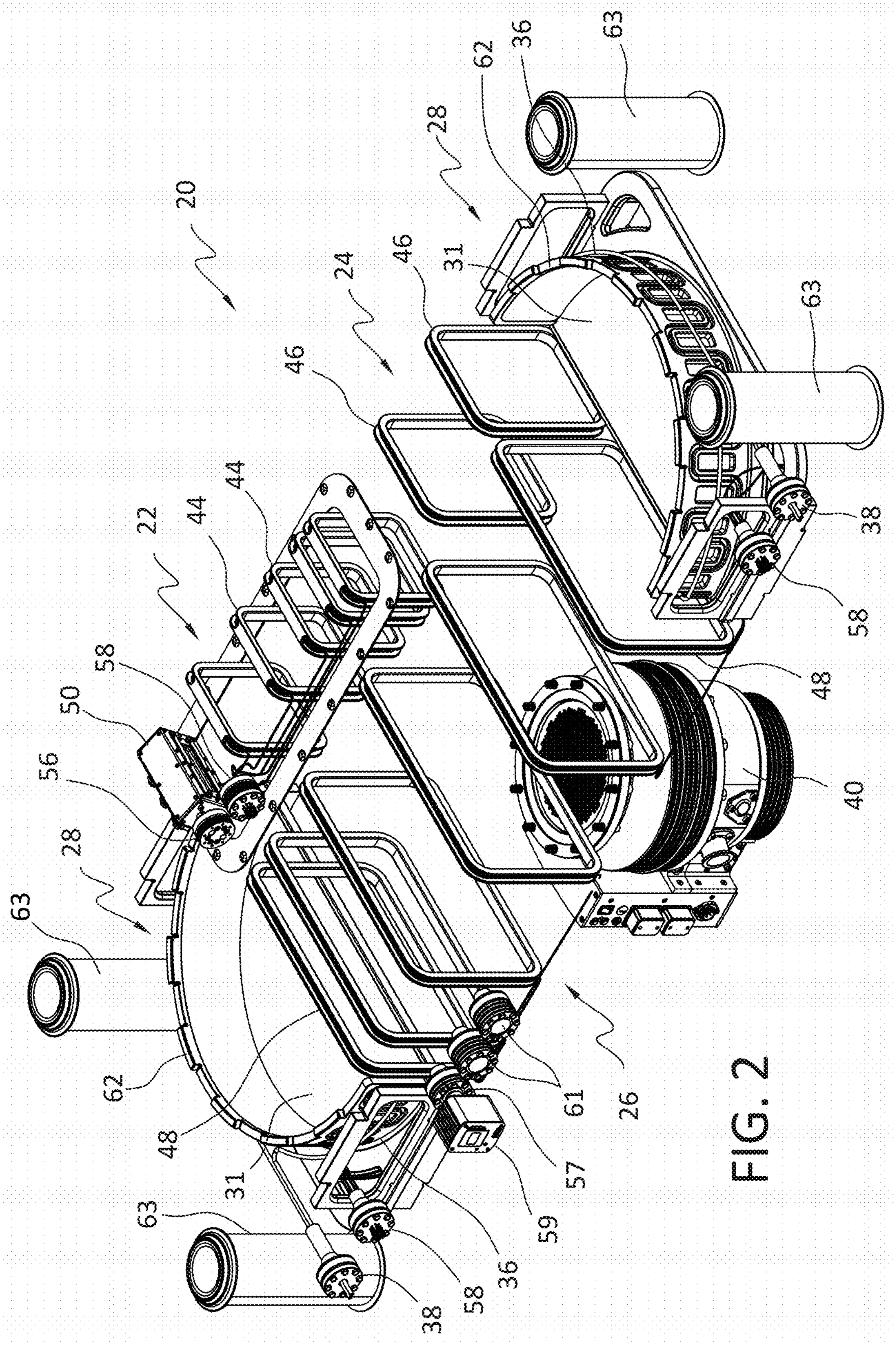
FIG. 2 is an isometric view of the components of a pulsed ion current antenna according to the invention.
Figure 3:
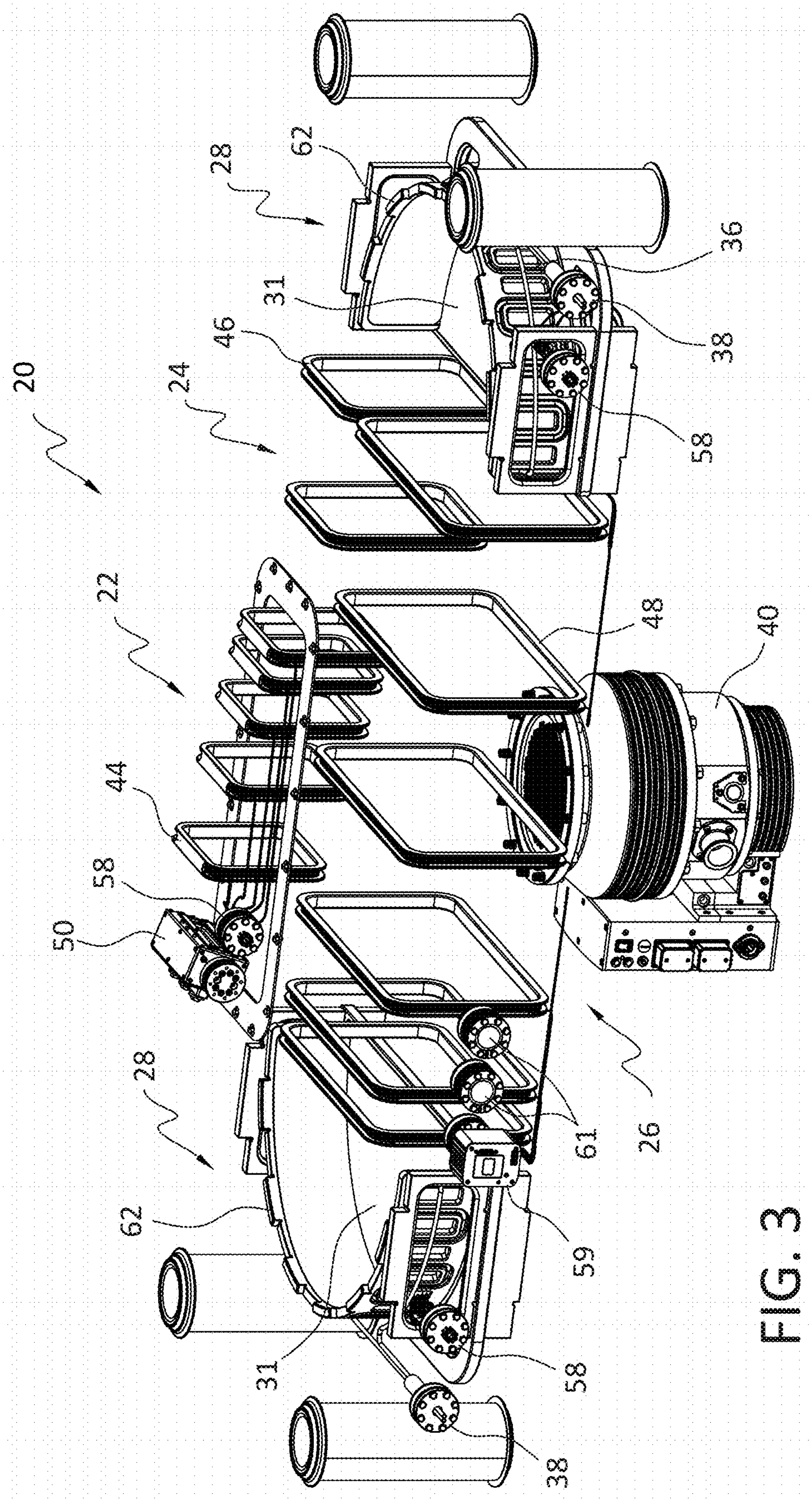
FIGS. 3, 4, and 5 are different oblique views of the pulsed ion current antenna components of FIG. 2.
Figure 4:
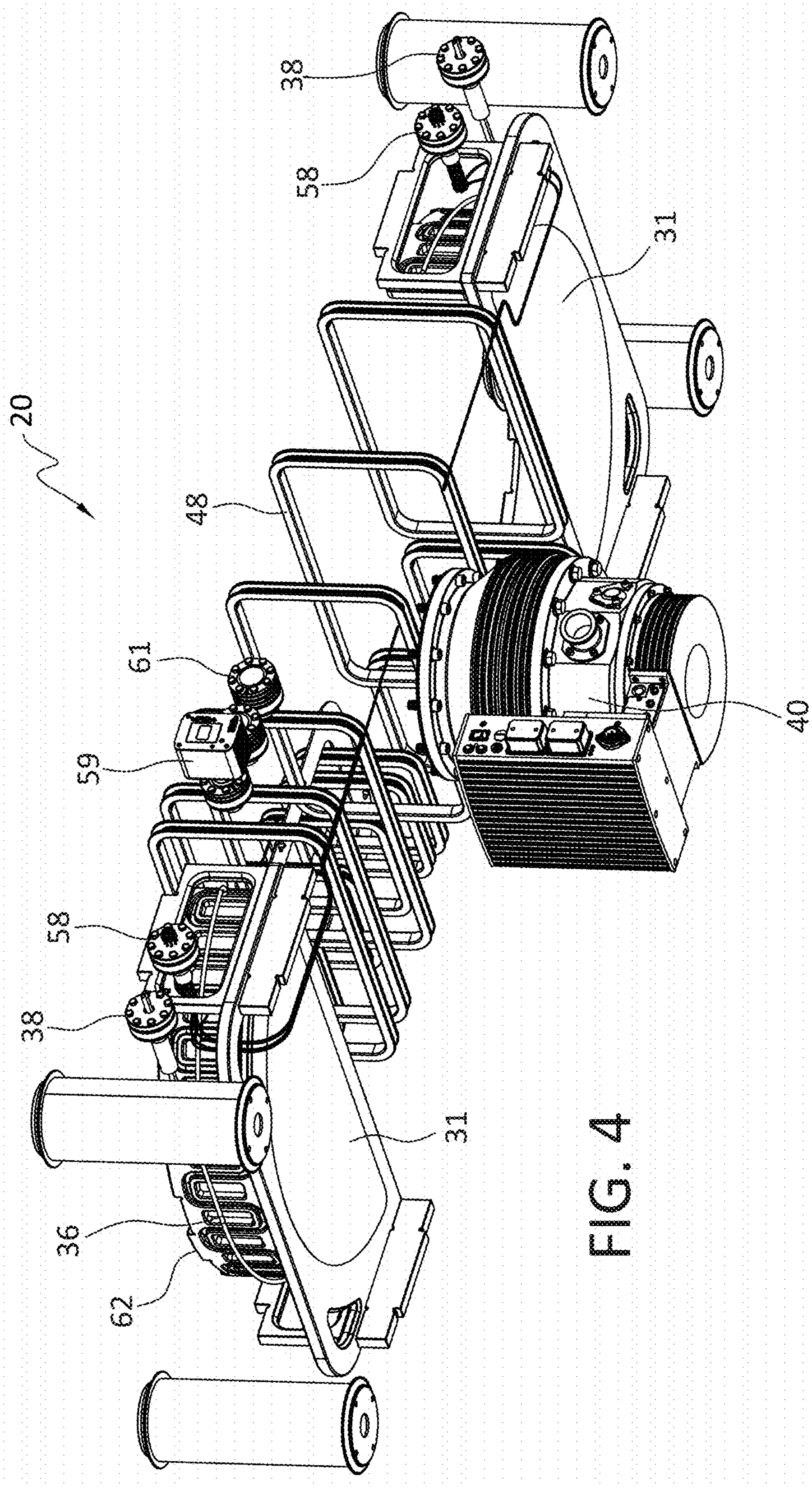
Figure 5:
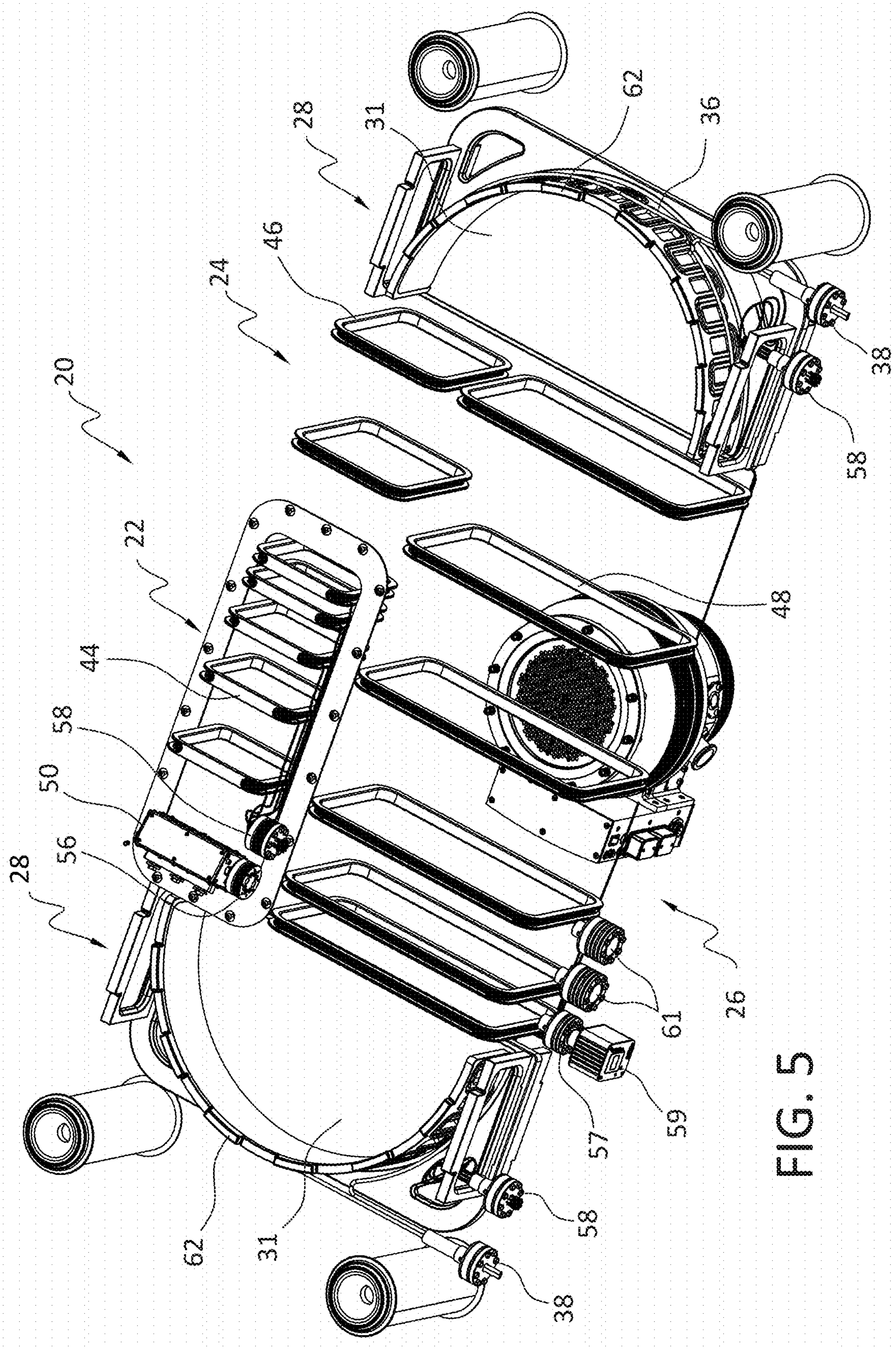

Concerning FIGS. 2-5, there are shown certain components of a pulsed ion current antenna 20 according to the invention. The pulsed ion current antenna includes an injection zone 22, a merging zone 24, two beam bending zones 28, and a beam return zone 26. A vacuum pump 40 such as a diffusion pump is provided to create a vacuum throughout injection zone 22, merging zone 24, beam bending zones 28, and beam return zone 26.

In operation of pulsed ion current antenna 20, an ion beam pulse cycles through the antenna, at a frequency of about 20 kilohertz for example. When the leading edge of an ion current pulse arrives at merging zone 24, additional ions are injected through injection zone 22, at a current of about 1 ampere for example, and are layered onto the ion current pulse, not to increase speed as in a racetrack microtron, but, rather, to aggregate current. Thus, instead of charged particles following different return paths on different successive cycles, the current of ions in pulsed ion current antenna 20 increases as the current cycles around the antenna, following the same path each time, the total current becoming very high, such as 1000 amperes, and being limited only by loss or saturation mechanisms due to collisions between ions that tend to cause diffusion that disperses the ion beam, or due to magnetic field irregularities caused, for example, by permanent magnet irregularities, etc.

The ion beam pulse can occupy, for example, half of the pathway around the interior of antenna 20, and can be achieved by precisely initiating and terminating the injection of current through injection zone 22, cyclically, at the frequency at which the ion beam pulse cycles through antenna 20. On each cycle, the initial merging of the current from injection zone 22 into merging zone 24 occurs at the leading edge of the ion beam pulse, and then as the half-cycle ion beam pulse continues clockwise through antenna 20, current from injection zone 22 continues to be layered on top of the main ion beam pulse in merging zone 24. Once the ion beam pulse has been aggregated to the desired current, the antenna structure functions as a high-power electric dipole antenna.

Injection zone 22, merging zone 24, and beam return zone 26 consist of three respective sets of loop coils 44, 46, and 48 that generate the magnetic field in each respective zone. Linear ion source 50 is provided at the upper end of injection zone 22.

Merging zone 24 is where the layering of current from injection zone 22 onto the main ion beam pulse occurs. The layering can be accomplished, for example, by a "beam focusing" technique that involves layering the current from injection zone 22, which is tilted at a slight angle of about 1 to 5 degrees relative to the main ion beam pulse, as a thin layer on top of the main ion beam pulse, which is thicker (has a higher beam density). The loop coils 44 in the ion injection zone 22 cause ion current from the ion injection zone to be injected into the beam merging zone 24 parallel to the ion beam pulse. Magnetic loop coils 46 of merging zone 24 shape the beam merging geometry so that the current from injection zone 22 joins smoothly with the main ion beam pulse. If the current from injection zone 22 and the main ion beam pulse have approximately the same velocity, coherency (same velocity for all charged particles) is ensured. Through a diffusion process, the main ion beam pulse becomes more dense as the current from injection zone 22 diffuses into the main ion beam pulse. Although the merging beams are shaped as much as possible by loop coils 46 of merging zone 24, there still must necessarily be a slight angle of the current from injection zone 22 relative to the main ion beam pulse.

Each beam bending zone 28 includes an electromagnet 62 and two parallel magnet plates in the form of bottom permanent magnets 31 and top permanent magnets 30 (illustrated in FIG. 6), which in combination produce respective magnetic fields that bend the path of travel of the ion beam pulse 180 degrees. Each bending zone 28 may need a thermal protection surface such as a steel plate to avoid ion beam thermal damage (i.e., ion beams making physical contact with top permanent magnets 30 and bottom permanent magnets 31). Accordingly, a thin layer of steel may be laminated to the top of bottom permanent magnets 31 and underneath top permanent magnets 30. The thermal protection of permanent magnets 30 and 31 in bending zones 28 using a laminated steel sheet or plate may have a protective effect on lifetime of permanent magnets 30 and 31.

After a turn through one of bending zones 28, the cross-section of the main ion beam becomes larger, the ion beam having diffused out into a larger cross-section. Loop coils 48 of beam return zone 26 are tapered in spacing, the spaces between the coils becoming successively narrower to merge the particle beam down into a smaller cross-section. There is a similar tapering of loop coils 46 of injection zone 22.

For antenna 20 to function as an electric dipole antenna, the ion beam pulse must be finite in length and must be modulated by changing beam speed. Through frequency modulation, a change in frequency is used to send information. To change frequency, the speed of the ion beam pulse must change.

In certain embodiments of the invention, two different techniques are used in combination with each other for modulating the speed of the ion beam pulse.

The first technique, source voltage modulation, is to use a modulator 64 (illustrated in FIG. 7) to modulate the beam source voltage of ion source 50 by applying a higher anode voltage, thereby increasing the speed of the ion beam within injection zone 22. After a certain amount of time of the ion beam from injection zone 22 mixing with the main ion beam bunch (on the order of milliseconds), the speed of the entire main ion beam bunch gradually matches with the speed of the ion beam within injection zone 22. This technique is the slow modulation technique. Although it is relatively slow, it has the advantage of a low power requirement.

The second technique, which is faster and therefore results in a higher data rate, but which requires more power consumption, is to use modulator 64 to modify the voltage applied to the two loop coils 46 in merging zone 24 to create an electrostatic field bias between the two coils to accelerate or decelerate the main ion beam to change the frequency of all of the ions in the main ion beam bunch very quickly, on the order of tens of microseconds. Thus, loop coils 46 serve two purposes: assisting in the merging of the current from injection zone 22 into the main ion beam bunch, and beam modulation. If only the second modulation technique is used, because of the high power requirement, it is possible to change frequency within only a narrow bandwidth (for example, 50 hertz), which is about a factor of 100 smaller than the bandwidth that can be obtained using the first modulation technique.

The first and second techniques can be combined to modulate beam speed to provide a fast modulation rate antenna with a bandwidth of, for example, 5 to 10 kilohertz (from 15 to 25 kilohertz), which is high enough to enable data transfer at about 100 times typical known technologies such as large metal antennae. For data communication in VLF, there are three important considerations: high output (a sufficiently strong antenna), a sufficiently fast modulation rate, and a sufficiently large bandwidth, the last two considerations being important for ensuring a good data rate in communication. By manipulating the voltage at the source anode of ion source 50 and the voltage applied to loop coils 46 of merging zone 24, it is possible to combine the first and second techniques to thereby combine the advantages of large bandwidth and high modulation rate. Signal processing from two different control mechanisms must be combined to use both the first and second techniques to maximize the data transfer rate. In general, there is also a tradeoff between the size of antenna 20 and the bandwidth.

Furthermore, cooling water jackets 36, which may be in the form of a water-filled tube as illustrated in FIGS. 2-5, are formed around the magnetic components of bending zone 28, with the water inlet and outlet ports 38 providing a flow of water through water jackets 36. During the operation of pulsed ion current antenna 20, water jackets 36 cool the magnetic structures within the antenna. Linear ion source 50 may also include a water jacket, and water inlet and outlet ports therefor. In addition to water inlet and outlet ports 38, port 56 is provided to supply electrical leads for the linear ion source, ports 58 are provided to supply electrical leads for the DC current for the loop coils of the injection zone, merging zone, beam bend zones, and beam return zone. Port 57 interfaces with a commercially available vacuum pump gauge 59, and auxiliary ports 61 are provided that can be used for connecting additional diagnostic instrumentation, sensors, inlets for other vacuum pumps, etc. Table top column support structures 63 are used to interconnect an external bottom cover (shown in FIG. 6) and an external top cover (shown in FIG. 7) of the pulsed ion current antenna.

Figure 6:
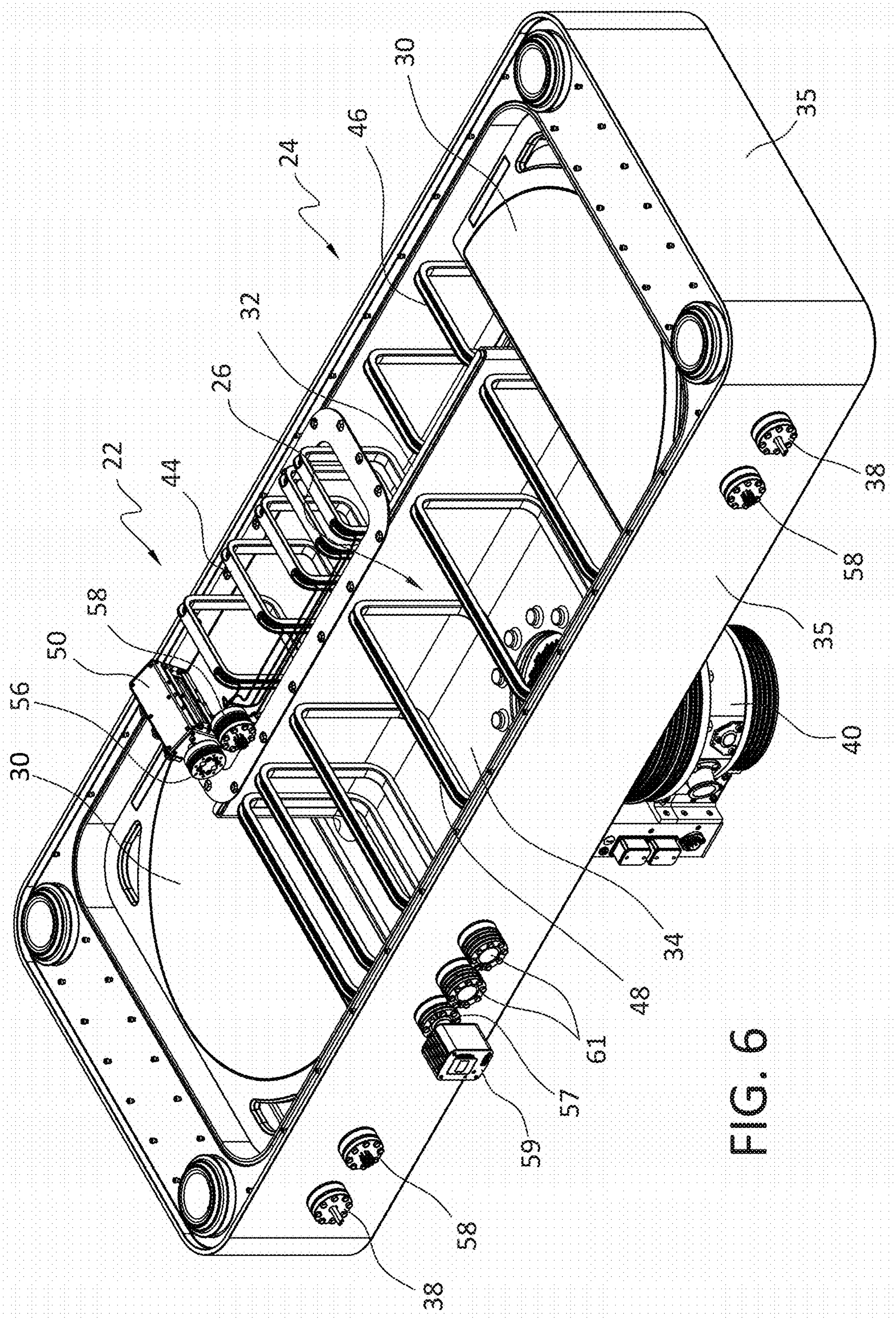
FIG. 6 is an isometric view of the pulsed ion current antenna components of FIG. 2 further incorporating internal covers for the beam bending zones, an internal side wall, an external bottom cover, and an external side wall.

FIG. 6 illustrates the components of FIGS. 2-5 combined with an internal wall 32 that separates injection zone 22 and merging zone 24 from beam return zone 26, side walls 35, and an external bottom cover 34.

Figure 7:
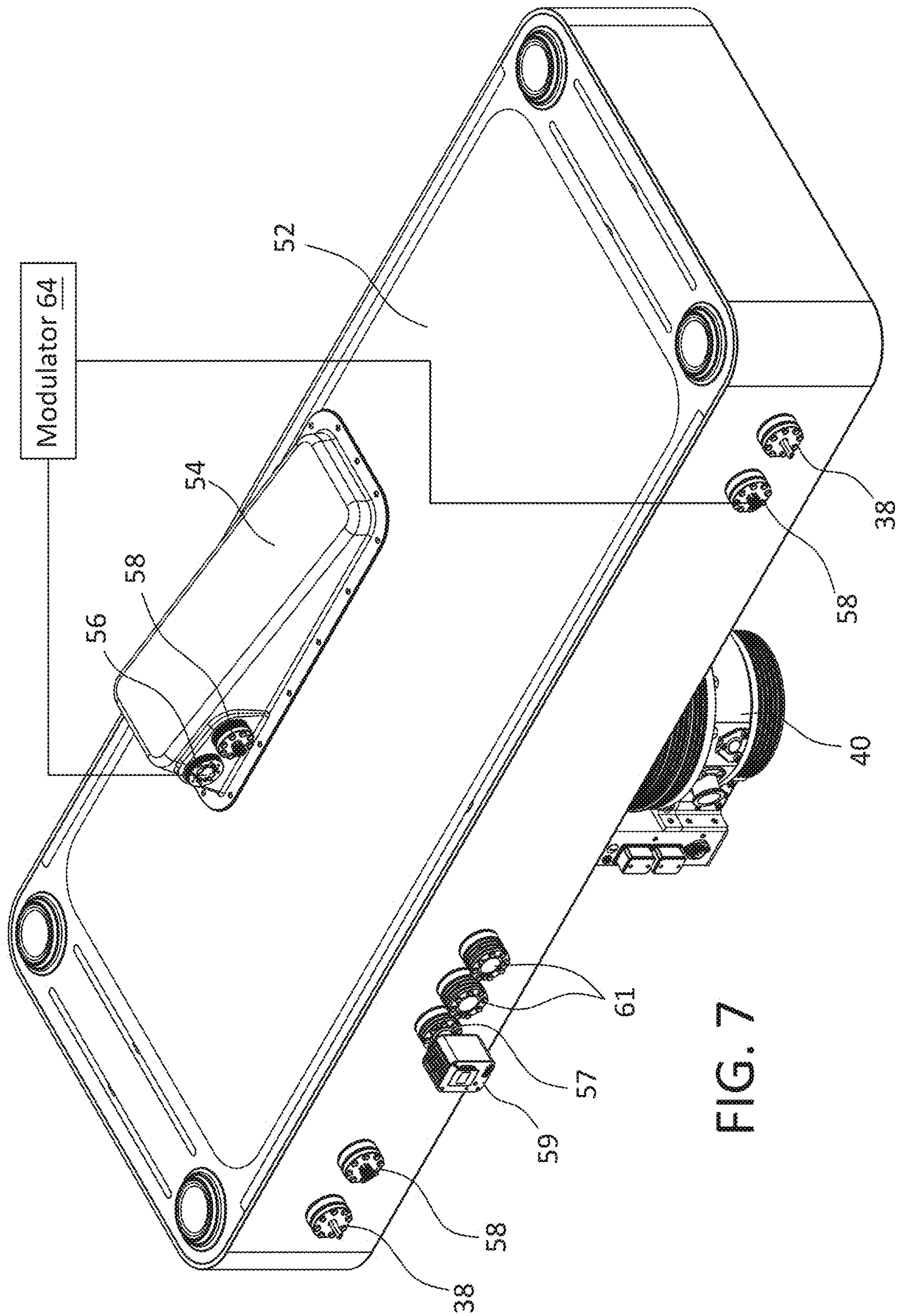
FIG. 7 is an isometric view of the pulsed ion current antenna components of FIG. 6 further incorporating an external top cover and an external cover for the injection region.

FIG. 7 illustrates the components of FIG. 6 further incorporating an external top cover 52 for the main body of antenna 20, and an external cover 54 for the injection region. Internal wall 32, side walls 35, external bottom cover 34, external top cover 52, and external cover 54 may be made of dielectric material, for example, acrylic or polycarbonate, or glass.

What has been described is a pulsed ion current antenna and methods for use thereof. While a particular form of the invention has been illustrated and described, it will be apparent that various modifications and combinations of the invention detailed in the text and drawings can be made without departing from the spirit and scope of the invention. The illustrated pulsed ion current antenna is just a representative embodiment. Accordingly, it is not intended that the invention be limited, except as by the appended claims.

What is claimed is:

1. A pulsed ion current transmitter, comprising:

an enclosed racetrack having an interior configured to be placed under vacuum, the enclosed racetrack having an ion injection zone, a beam bunch merging zone, a first beam bunch bending zone, a beam bunch return zone, and a second beam bunch bending zone;

an ion source provided at an end of the ion injection zone;

two parallel magnet plates provided in each of the first and second beam bunch bending zones, configured to produce a respective magnetic field that bends a path of travel of an ion beam bunch within the enclosed racetrack;

a plurality of loop coils configured to generate magnetic fields in one or more of the ion injection zone, the beam bunch merging zone, and the beam bunch return zone, to shape travel of ions within the enclosed racetrack such that ions from the ion source that are injected through the ion injection zone are merged in the beam bunch merging zone into an ion beam bunch within the enclosed racetrack, which ion beam bunch is redirected by the first beam bunch bending zones into the beam bunch return zone and then redirected by the second beam bunch bending zone back to the beam bunch merging zone; and a modulator connected to the ion source and/or at least some of the loop coils such that a radiating electromagnetic wave produced by the ion beam bunch carries a data signal in a very low frequency (VLF) spectrum of 3 kHz to 30 kHz or a low-frequency (LF) spectrum of 30 kHz to 300 kHz.

2. The pulsed ion current transmitter in accordance with claim 1, wherein there are a plurality of the loop coils in each of the ion injection zones, the beam bunch merging zone, and the beam bunch return zone.

3. The pulsed ion current transmitter in accordance with claim 1 wherein there are a plurality of loop coils in the ion injection zone, which are tapered in spacing, the spaces between the coils becoming successively narrower away from the ion source.

4. The pulsed ion current transmitter in accordance with claim 1 wherein there are a plurality of loop coils in the beam bunch merging zone, configured to shape beam bunch merging geometry so that current from the ion injection zone joins smoothly with the ion beam bunch in the beam bunch merging zone.

5. The pulsed ion current transmitter in accordance with claim 1 wherein there are a plurality of loop coils in the beam bunch return zone, which are tapered in spacing, the spaces between the coils becoming successively narrower.

6. The pulsed ion current transmitter in accordance with claim 1, wherein further comprising an electromagnet provided in each of the first and second beam bunch bending zones.

7. The pulsed ion current transmitter in accordance with claim 1, wherein the two parallel magnet plates provided in each of the first and second beam bunch bending zones are configured to produce a respective magnetic field that bends a path of travel of the ion beam bunch within the enclosed racetrack 180 degrees.

8. The pulsed ion current transmitter in accordance with claim 1, further comprising at least one cooling water jacket configured to cool at least a portion of the pulsed ion current transmitter.

9. The pulsed ion current transmitter in accordance with claim 8, wherein at least one cooling water jacket is configured to cool the two parallel magnet plates provided in each of the first and second beam bunch bending zones.

10. A method of operating a pulsed ion current transmitter, comprising:

producing ions from an ion source;

causing the ions produced by the ion source to be injected into an enclosed racetrack under vacuum through an ion injection zone of the enclosed racetrack;

causing the ions injected through the ion injection zone to be merged in a beam bunch merging zone of the enclosed racetrack with an ion beam bunch within the enclosed racetrack, wherein the ions injected through the ion injection zone enter the beam bunch merging zone when the ion beam bunch is present in the merging zone;

redirecting the ion beam bunch within the enclosed racetrack, by a first beam bunch bending zone of the enclosed racetrack, into a beam bunch return zone of the enclosed racetrack; and redirecting the ion beam bunch within the enclosed racetrack again, by a second beam bunch bending zone of the enclosed racetrack, back to the beam bunch merging zone; and modulating the ion beam bunch within the enclosed racetrack to cause a radiating electromagnetic wave produced by the ion beam bunch to carry a data signal in a very low frequency (VLF) spectrum of 3 kHz to 30 kHz or a low-frequency (LF) spectrum of 30 kHz to 300 KHz.

11. The method in accordance with claim 10, wherein modulation of the ion beam bunch comprises modulating production of the ions from the ion source, thereby increasing speed of the ions within the ion injection zone, so that after a certain amount of time of the ions from the ion injection zone mixing with the ion beam bunch in the merging zone, the speed of ion beam bunch gradually matches with the speed of the ions within the ion injection zone.

12. The method in accordance with claim 10, wherein the modulating of the ion beam bunch comprises modifying voltage applied to a plurality of loop coils within the enclosed racetrack to create an electrostatic field bias between the plurality of loop coils to accelerate or decelerate the ion beam bunch to change frequency of all of the ions in the ion beam bunch very quickly.

13. The method in accordance with claim 12, wherein the plurality of loop coils for which voltage is modified for modulating the ion beam bunch is located within the beam bunch merging zone.

14. The method in accordance with claim 13, wherein the plurality of loop coils for which voltage is modified for modulating the ion beam bunch is also used for assisting in merging the ions from the ion injection zone into the ion beam bunch.

15. The method in accordance with claim 12, wherein the modulating of the ion beam bunch by modifying voltage applied to the plurality of loop coils within the enclosed racetrack is combined with modulating of the ion beam bunch by modulating the producing of the ions from the ion source, thereby increasing speed of the ions within the ion injection zone, so that after a certain amount of time of the ions from the ion injection zone mixing with the ion beam bunch in the merging zone, the speed of ion beam bunch gradually matches with the speed of the ions within the ion injection zone.

16. The method in accordance with claim 10, wherein the ion beam bunch occupies approximately half of a pathway of the ion beam bunch through the enclosed racetrack.

17. The method in accordance with claim 10, comprising precisely initiating and terminating injection of current through the ion injection zone, cyclically, at a frequency at which the ion beam bunch cycles through the enclosed racetrack, such that on each cycle, an initial merging of the ions from the ion injection zone into the merging zone occurs at a leading edge of the ion beam bunch.

18. The method in accordance with claim 10, comprising using a beam bunch focusing technique in the beam bunch merging zone to layer current from the ion injection zone onto the ion beam bunch by layering a thin layer of the current from the ion injection zone onto the ion beam bunch, and by using magnetic loop coils of the merging zone to shape beam bunch merging geometry so that the current from ion injection zone joins smoothly with the ion beam bunch.

19. The method in accordance with claim 10, wherein ion current from the ion injection zone and the ion beam bunch in the merging zone have approximately the same velocity, so as to ensure coherency of the ion beam bunch.

20. The method in accordance with claim 10, comprising using magnetic loop coils of the ion injection zone to cause ion current from the ion injection zone to be injected into the beam bunch merging zone parallel to the ion beam bunch.

* * * * *